Sept. 13, 1966     G. CAMARDELLA     3,271,839
CONTINUOUS COIL WINDING MACHINE
Filed Sept. 30, 1965     3 Sheets-Sheet 1

Inventor
Giuseppe Camardella
By
Stevens, Davis, Miller & Mosher
Attorneys

Sept. 13, 1966  G. CAMARDELLA  3,271,839
CONTINUOUS COIL WINDING MACHINE
Filed Sept. 30, 1965  3 Sheets-Sheet 2
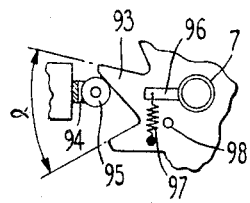
FIG. 3
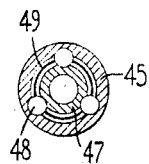
FIG. 5
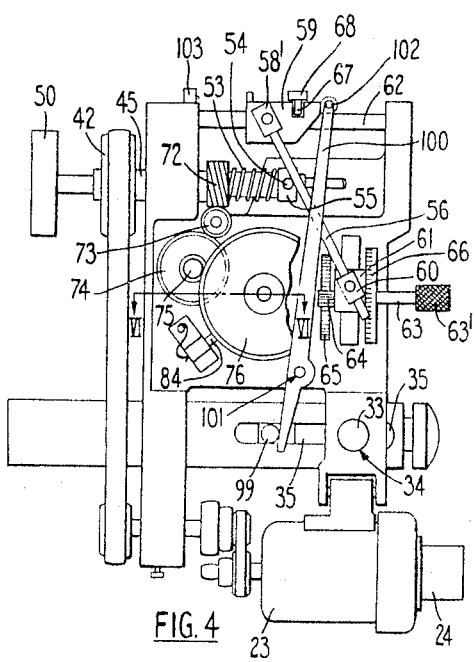
FIG. 4
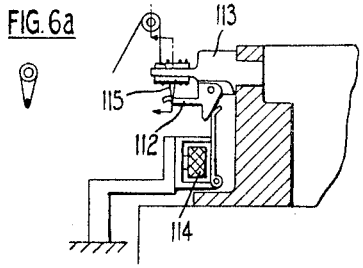
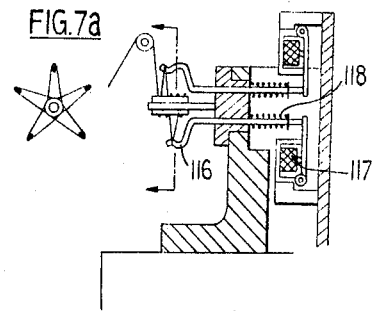
Inventor
Giuseppe Camardella
By
Stevens, Davis, Miller & Mosher
Attorneys Sept. 13, 1966     G. CAMARDELLA     3,271,839
CONTINUOUS COIL WINDING MACHINE
Filed Sept. 30, 1965     3 Sheets-Sheet 3

Inventor
Giuseppe Camardella
By
Attorneys

United States Patent Office 3,271,839
Patented Sept. 13, 1966

3,271,839
CONTINUOUS COIL WINDING MACHINE
Giuseppe Camardella, Via E. Biondi 1, Milan, Italy
Filed Sept. 30, 1965, Ser. No. 491,801
Claims priority, application Italy, Oct. 3, 1964,
21,342/64
18 Claims. (Cl. 29—33)

In the field of the wire coil production two types of coil winding units, more or less complex, have been developed, adapted to carry out wire coils or windings generally on a support core. Among these, a coil winder type provides to feed the wire from a substantially stationary position and to rotate the winding support for the execution of the coil; the translation for the turns distribution is left to the support and/or wire guide.

A coil winder type, in which the winding support is retained fixed, and the wire guide rotates and displaces in relation to the same, has proven instead of better performance from both the standpoint of capacity to execute complex windings (particular turns distribution) and productivity.

Generally speaking, these machines, besides executing the coil windings, also carry out the turns gluing in order to avoid release and separation of the individual coils.

Object of this invention is a coil winding machine which is adapted to carry out simple and complex windings in a fully automatic manner and subsequent finish of the coils, such machine constituting substantially a development of the aforementioned machine described in the co-pending patent application. Said machine is of the carousel type, in which each coil is displaced subsequent to winding to the successive finishing stations, it being substantially characterized by comprising at least one of the following adjustment and control means associated with an easily interchangeable cam:

(a) A control device for the rotation of the wire guide, adapted to ensure the displacement of the latter in the direction of its rotating axis, comprising a rotary but axially stationary hollow driving shaft, set in rotation by driving means, and a driven shaft associated with the wire guide and disposed inside the driving shaft, both said shafts being provided with longitudinal grooves on the opposite faces, inside which rolling means engage with a key function for the rotating motion drive.

(b) A motion drive operating between the stationary frame of the machine and a winding head which is radially movable in relation to the frame to transfer from this to the head a control motion having a constant amplitude for whatever mutual position and independent of this position, comprising a two-part rod, consisting of a screw and nut, respectively, the thread pitch of which exactly corresponds to the co-axial thread pitch of the screw and nut assembly controlling the head radial displacement.

(c) A set of hooks, mounted on the support plug carousel of the coils to be wound and associated with each of them, which are adapted for displacement on the trajectory of the working wire guide for the formation of intermediate taps via automatic control assemblies mounted on the stationary portion of the machine frame at the coil winding station.

(d) A coil turns fixing assembly comprising means for conveying a minimum quantity of wax at a turns gluing line at least, disposed on a diametral plane of the coil being parallel to the carousel.

(e) A coil terminal tinning assembly comprising a rotary crucible containing melted tin, which is vertically movable to shift in the adjacencies of the coil wound, where the terminal dipping takes place.

(f) A terminal bending assembly comprising a fork embracing the coil and being movable in relation to the same.

The present invention is however better described with reference to the accompanying drawings, representing a preferred non-limiting embodiment form, in which:

FIG. 3 represents a detail of the carousel assembly;

FIG. 4 represents the only winding head viewed from the side being opposite the side in FIG. 1;

FIG. 5 represents a cross section of the winding shaft along the line VII—VII in FIG. 1;

FIGS. 6 and 6bis represent in axial section and front view, respectively, a plug of the carousel, provided with a system for providing intermediate taps according to a generatrix of the coil;

FIGS. 7 and 7bis are views closely analogous to those give in FIGS. 6 and 6bis relative to another system of intermediate taps;

Figure 1:
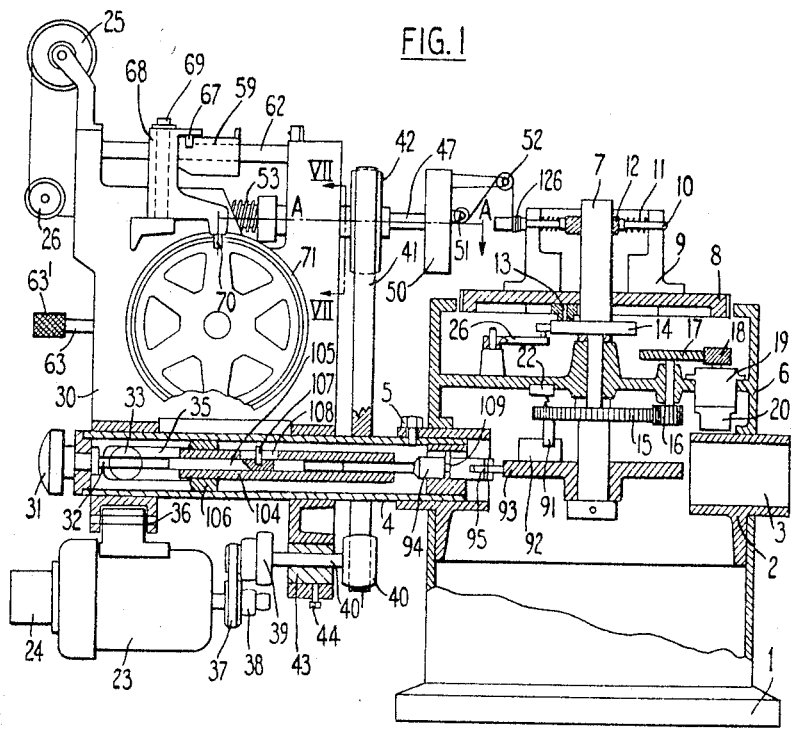
FIGS. 1 and 2 represent the coil winder according to the invention complete with base, carousel and a winding head in elevation and plan views, respectively, with parts in section.

According to the present invention (FIGS. 1–2), the base 1 supports the annular structure 2 provided with radial holes 3.

In the holes 3 are fixed the support shafts of the operating stations: of these only the hollow shaft 4 of the winding head fastened by means of the screw 5 is represented.

On the structure 2 is further fixed the carousel frame 6. In center of the frame is fixed the shaft 7, which constitutes the free rotation pin of the rotary table 8, provided with the crown 9 of plugs 10; the rotary table 8 is designed to support accessories adapted to carry out particular operations on the plugs 10. In the case illustrated, the plugs 10 may be retracted into the crown 9 and kept by the action of the springs 11 in contact with the cam 12 integral with the shaft 7, and of such a configuration that when in unloading position the plug 10 automatically slips off the piece supported unloading it. The intermittent rotation of the table 8 is actuated by the knob 13, supported by the shaped disc 14, which is caused to rotate through the gears 15, 16, 17, 18 by the motor 19 provided with the brake 20. The knob 13 drags the table 8 by means of the radial cavities 21 provided on its lower part e.g. by a Maltese cross advancing system and subsequent locking known from the Italian patent application Number 46,057 of April 11, 1964 filed by the same applicant; at the end of each dragging cycle the table 8 is stopped by the mechanical contactor 22, which has the dual task of breaking off current to the motor 19, supplying it to the motors of the operating stations; particularly to the motor 23 of the winding head.

On the tubular shaft 4 is supported, as mentioned, the frame 30 of the winding head with possibility of axial sliding for setting the distance of the head from the crown 9 and with accurate angular keying by not shown key. The distance of the head from the crown 9 is finely varied by acting upon the knob 31 integral with the axially fixed screw 32. The rotation of the screw 32 causes, therefore, the dragging of the nut 33 which with its cross bar shape engages with the eye 34 of the frame 30 via two eyelets 35 provided on the tube 4.

Underneath the frame 30 is fixed the driving system of the head; this is constituted of the two-speed motor 23 with brake 24, which may swing on the pin 36 for tensioning the belt 37 between both cones of pulleys 38 and 39, constituting the gear box.

Figure 2:
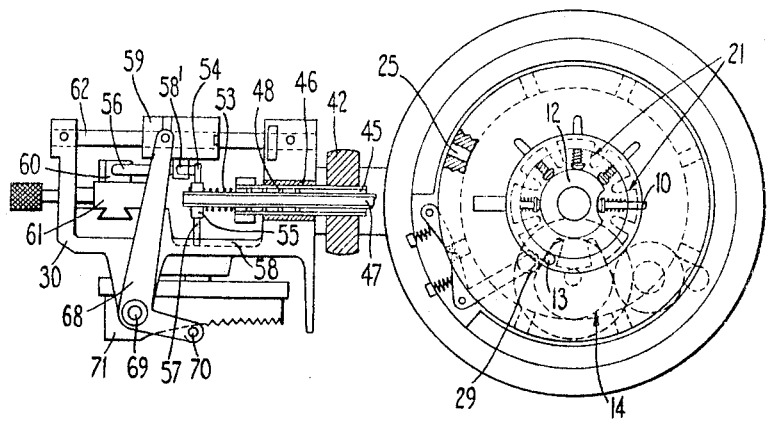

From the cone 39 motion is driven to the pulley 40 via the shaft 40' and then to the belt 41 and finally to the pulley 42. The eccentric bushing 43 supporting the shaft 40' permits to tension the belt 41; it is locked into position by the screw 44, the pulley 42 being keyed on the hollow shaft 45 rotating inside the bushing 46 (FIG. 2).

The rotating motion is delivered to the shaft 47 of the wire guide via rolling means such as balls or rollers 48 kept in position by a tubular cage 49 (FIGS. 2 and 7) and engaging inside opposite longitudinal grooves provided on the shafts 45 and 47; this construction permits that the shaft 47, supporting the wire guide assembly, composed of the support 50 and the pulleys 51 and 52, could rotate dragged by the hollow shaft 45, but also slide freely in relation thereto.

Upon the rotation of the carousel an operating mechanical relationship is established between the carousel itself and the winding head. The toothed wheel 15, rotatable on the shaft 7 (FIG. 1) leads in its rotation the pin 91 to act against the catch 92 of the cam 93 with saw teeth (FIG. 3) mounted idle on the same shaft 7. The cam 93 oscillates consequently the angle α required to impart a reciprocating motion to the stem 94 by means of the roller 95.

The cam 93 is then immediately brought back to a rest position by the spring 97, acting to bring the pin 98 against the stationary pin 96.

The motion of the stem 94 is delivered through different intermediate organs the function of which will be described a bit farther to the pin 99 (FIG. 5) which projects from the eyelet 35 of the hollow shaft 4 in order to act against an end of the lever 100 pivoted in 101. The latter acts through the roller 102 which it carries at the other end on the slider 59, so as to bring it again forward upon completion of the winding in the carousel translation phase. This forward motion also involves the raise of the finger 70 of the cam 71, so that this may return to its rest position without knocking against the tooth 70, however its profile may be. The return of the cam 71 is caused at the end of the stroke of the slider 59 by the action of this on the contactor 103, which opens the current supply circuit to a cam control coil, thereby ensuring its return to a rest position. Upon completion of the carousel cycle, the pin 99 returns forward, releasing the lever 100 and the slider 59, so that the head is ready to start off a further winding.

The aforementioned organs interplaced between the stem 94 and the pin 99 have substantially the purpose of automatically holding unchanged the position of the working stroke of the pin 99 in relation to the winding head at the moment in which the latter is displaced along the hollow shaft 4 to adjust its distance from the carousel. Said organs are essentially constituted of the sleeve 104 (FIG. 1) with an extreme screwed on the threaded shank of the stem 94 and with the opposite extreme sliding but not rotatable on the pin 105, extension of the adjusting screw 32. To the outside of the sleeve 104 is mounted the collar 106 between two backings making it rotatable but not sliding on the sleeve 104: the collar 106 is designed to support the pin 99. During the stroke of the stem 94, the sleeve 104 slides over the pin 105 with any other effect than moving the pin 99. The rotation of the screw 32 instead rotates the sleeve 104 by means of the plug 107 engaged in the eyelet 108, and since the stem 94 cannot rotate because of the plug 109 there occurs a screwing between the sleeve 104 and the stem 94. If the lead of the threads of the stem 94 and screw 32 is alike, the relative displacement between the winding head and the shaft 4 is repeated unchanged between the sleeve 104 and the stem 94 with the desired effect of an unchanged action of the pin 99.

As mentioned, associated with the carousel 9 are provided auxiliary devices for the execution and finish of the coils. A device adapted to provide intermediate taps in the winding is represented in FIGS. 6 and 6bis. It substantially entails a book 112 pivoted on the same base of the plug 113, which is set in action by the core of the electromagnet 114; the latter is sustained by the stationary portion of the carousel frame. The hooks 112 may be, of course, more than one and of different length, and for each of them a corresponding electromagnet will be provided. The intermediate taps are then obtained from the wire loops 115 forming at the moment when a hook 112 is raised, interferring with the trajectory of the wire under winding; inasmuch as the hooks 112 are associated with the carousel 8, the loops 115 remain under tension even when the carousel rotates upon completed winding, so that the fixing and exact cutting of terminals occur where and when more appropriated.

A changes embodiment of the intermediate tap device consisting in disposing the star hooks 116 is represented in FIGS. 7 and 7bis. Therein the hooks 116 axially slide under the control of the electromagnets 117 against the action of the springs 118. Also in this case, upon completed winding the hooks follow the rotation of the carousel, whilst the electromagnets are mounted on stationary supports, for example on the center column of the carousel itself as illustrated. The actuation of the electromagnets 114 or 117 is arranged by a contact 119 on which adjustable teeth act, one for each electromagnet, which are suitably disposed on the flat face of the support of the cam 71. Each impulse of said contact is sent in a suitable sequence to the electromagnets by interposition of a step by step relay (not shown) or other similar system.

Figure 8:
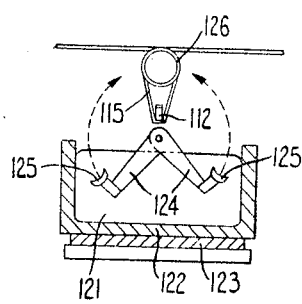
FIG. 8 represents a fixing system for the winding turns.

A finishing device designed to operate on as-soon-as executed windings is represented in FIG. 8. It comprises a wax bath 121, in whch the wax is kept dissolved in the container 122 by the heating resistor 123. The arms 124 carrying the pads 125 are normally immersed in the wax and are caused to rotate (by means of a simple device, which is not shown) to bring the pads themselves into contact with the winding 126 on which they apply an adequate quantity of wax to lock the turns. During this operation, the hooks 112 remain operating with the task to keep under tension the loops 115 for intermediate taps.

Figure 9:
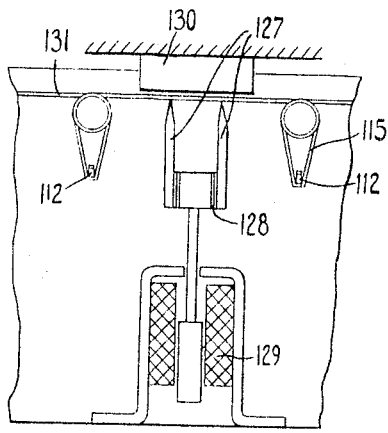
FIG. 9 represents a cutting system for the wire between two subsequent windings.

In connection with the aforementioned device is provided a wire cutting system (FIG. 9) connecting two subsequent windings, which involves two blades 127 the distance of which is adjustable by means of the shims 128, actuated by the electromagnet 129 to cut the wire 131 against the high tenacity resin block 130.

Figure 10:
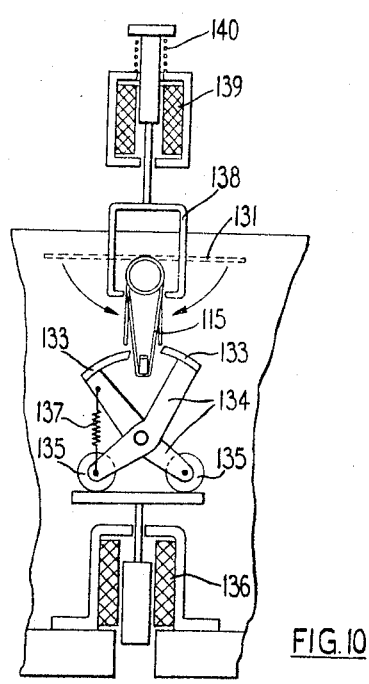
FIG. 10 represents an intermediate terminal cutting and bending system for the winding terminals.

A further finishing device is illustrated in FIG. 10; it comprises two cylindrical shearing blades 133 which cut the ends of the loops 115, thereby producing intermediate taps or terminals; in this manner, also the hooks 112 are released, which return to their rest position called back by a spring or by gravity. The blades 133 are pivoted via the levers 134 on the stationary pin 132 and actuated through the rollers 135 by the electromagnet 136. The spring 137 has the task to re-open the blades. Simultaneously with the closing of the blades operates a fork 138 which has the function to bend downward the horizontal terminals obtained from the cutting of the wire 131 carried out by the device in FIG. 9. To this effect the fork 138 is thrust downward under the action of an electromagnet 139, whilst a spring 140 provides to recover the system upward.

Figure 11:
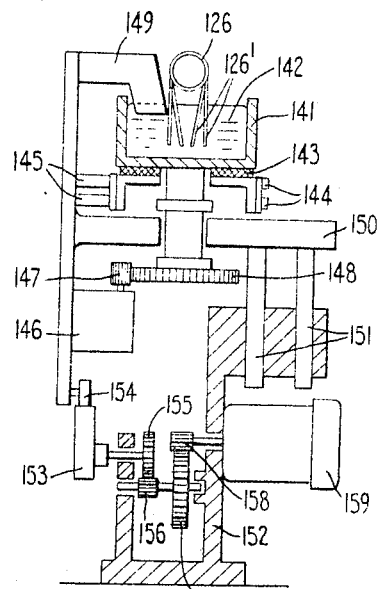
FIG. 11 represents a terminal tinning system.

Still another finishing device is illustrated in FIG. 11: it comprises a crucible 141 containing a melted tin alloy 142, which is kept at the adapted temperature by the electric resistor 143; the latter is supplied through the insulated bronze rings 144 and the brushes 145.

This connection system is made necessary by the fact that the crucible 141 is caused to rotate by the speed reducer 146 via the gears 147 and 148 so as to permit that a stationary plate 149, partially immersed in the melted tin, keeps the surface always cleared from slags and oxides, which are stopped against the plate 149 itself; this may be further shaped off so as to convey the slags outside the crucible under the slight thrust generated by the rotation. The crucible 141 and related moving organs are supported by a structure 150, which may vertically move, guided by the small columns 151 sliding inside two holes of the stationary structure 152. The structure 150 is caused to raise upon each tinning operation of the terminals 126', and hence is caused to get down to ensure the feed of the coil to the subsequent working station; the vertical motion is determined and controlled by the cam 153, on which the structure 150 rests by gravity through the roller 154. The cam 153 is caused to rotate by the system of gears 155, 156, 157, 158 and the electric motor 159. An electric contact system, closely analogous to that previously described, ensures the execution of a working cycle upon each stopping of the plug carousel 9.

It is understood that other embodiments than those described in the present specification could be developed without departing from the scope of the invention.

What I claim is:

1. Continuous coil winding machine adapted for mass production of entirely finished coils on supports or in air, and provided with a carousel conveying the coils, a series of finishing stations, in which the coil, conveyed by the carousel, will be operated and an easily interchangeable control cam, one of said stations comprising a wire guide associated with a control device for the rotation of the wire guide, adapted to ensure the displacement of the latter in the direction of its rotating axis under the control of said cam, said control device having a rotary but axially stationary hollow driving shaft, driving means to set in rotation said driving shaft, a driven shaft associated with the wire guide and disposed inside the driving shaft both said shafts being provided with longitudinal grooves on the opposite faces, inside which rolling means engage, having key function for the rotating motion drive.

2. Coil winding machine according to claim 1, in which said rolling means having a key function between the driving shaft and the driven shaft of the wire guide are constituted of balls.

3. Coil winding machine according to claim 1, in which said rolling means having a key function between the driving shaft and the driven shaft of the wire guide are constituted of cylindrical rollers.

4. Continuous coil winding machine adapted for mass-production of entirely finished coils on supports or in air, and provided with a carousel conveying the coils, a series of finishing stations, in which the coil, conveyed by the carousel, will be operated and an easily interchangeable control cam, at least one of said stations, which is radially movable in relation to the stationary frame of the machine, comprising a screw-and-nut assembly controlling the radial movement of the station and a motion drive operating between the stationary frame and the station, to transfer from frame to station a control motion having a constant amplitude for whatever mutual position and independent of this position, said motion drive consisting of a two-part rod, in form of a screw and a nut, respectively, the thread pitch of which exactly corresponds to the co-axial thread pitch of the said screw-and-nut assembly.

5. Coil winding machine according to claim 4, in which means are provided, operated by said motion drive, for translating the wire guide in the starting position at the end of each winding, said means controlling at the end of their stroke the return to zero of the cam.

6. Continuous coil winding machine adapted for mass production of entirely finished coils on supports or in air, and provided with a carousel conveying the coils, a series of finishing stations, in which the coil, conveyed by the carousel, will be operated and an easily interchangeable control cam, and a station in which a wire guide operates the coil winding, said carousel comprising a set of hooks, associated with each of the supports of the coils to be wound, each of said hooks being adapted for displacement on the trajectory of the working wire guide for the formation of intermediate taps via automatic control assemblies mounted on the stationary portion of the machine frame at the coil winding station.

7. Coil winding machine according to claim 6 in which are provided means operating in association with said loop forming hooks for the shearing of the ends of the loops themselves and formation of intermediate taps of the winding.

8. Coil winding machine according to claim 7, in which said means are constituted of a pair of electromagnetically controlled cylindrical blades.

9. Coil winding machine according to claim 6, in which said hooks for the formation of intermediate taps present themselves in form of oscillating levers which are caused to rotate through electromagnet controls about an axis normal to the coil axis.

10. Coil winding machine according to claim 9 in which a series of adjustable contacts are provided, associated to said control cam for the actuation of the control electromagnets for said hooks.

11. Coil winding machine according to claim 6, in which said hooks for the formation of loops are constituted of small rods sliding parallel to the axis of the relative coil against the action of return spring.

12. Coil winding machine according to claim 6 in which said hooks are disposed during operation in positions being substantially aligned parallel to the axis of the coil under winding.

13. Coil winding machine according to claim 6 in which said hooks are disposed during operation like a crown or star about the axis of the coil under winding.

14. Continuous coil winding machine adapted for mass production of entirely finished coils on supports or in air, and provided with a carousel conveying the coils, a series of finishing stations, in which the coil, conveyed by the carousel will be operated, and a coil turns fixing assembly comprising means for conveying a minimum quantity of wax at a turns gluing line at least, disposed on a diametral plane of the coil being parallel to the carousel.

15. Coil winding machine according to claim 14, in which said means to carry out the gluing of the turns comprise at least an oscillating arm the end of which is provided with a pad adapted to convey a minimum quantity of wax from bath in which it is immersed up to contact of the turns gluing line.

16. Continuous coil winding machine adapted for mass production of entirely finished coils on supports or in air, and provided with a carousel conveying the coils, a series of finishing stations, in which the coil, conveyed by the carousel, will be operated, and a coil terminal tinning assembly comprising a rotary crucible containing melted tin, which is vertically movable to shift in the adjacencies of the coil wound, where the terminal dipping takes place.

17. Coil winding machine according to claim 16, in which a stationary plate is provided associated with said rotary tinning crucible, said plate being partially immersed in the melted tin to eliminate slags and oxides floating on the melted tin.

18. Continuous coil winding machine adapted for mass production of entirely finished coils on supports or in air, and provided with a carousel conveying the coils, a series of finishing stations, in which the coil, conveyed by the carousel, will be operated and a terminal bending assembly comprising a fork embracing the coil and being movable in relation to the same.

No references cited.

RICHARD H. EANES, JR., *Primary Examiner.*